(No Model.)

W. KONRAD.
Detachable Cover for Glasses.

No. 230,188.                                Patented July 20, 1880.

Witnesses:
F. B. Townsend
Rich'd N. Dyer.

Inventor:
William Konrad
per Wm. H. Lotz
Attorney.

UNITED STATES PATENT OFFICE.

WILLIAM KONRAD, OF CHICAGO, ILLINOIS, ASSIGNOR OF TWO-THIRDS OF HIS RIGHT TO HERMANN HORN AND LOUIS BOCHE, OF SAME PLACE.

DETACHABLE COVER FOR GLASSES.

SPECIFICATION forming part of Letters Patent No. 230,188, dated July 20, 1880.

Application filed March 29, 1880. (No model.)

*To all whom it may concern:*

Be it known that I, WILLIAM KONRAD, of Chicago, in the county of Cook and State of Illinois, have invented a certain new and useful Improvement in Detachable Covers for Glasses, of which the following is a specification.

The object I have in view is to produce a hinged cover, more especially designed for use upon drinking glasses or mugs, but also well adapted for sugar-bowls and other vessels whose contents it is desired to protect from insects and dirt, which cover can be readily attached to any glass or mug without the glass being especially constructed to receive it, and can be easily and quickly detached, and is capable of being conveniently opened and closed when the glass or mug is in use.

My invention therein consists, principally, in a cover hinged to a clamp and adapted to be thereby removably attached at any point to the rim of a glass, mug, or other like vessel, without such rim being especially constructed to receive the cover, and, further, in the combination of the parts composing my removable cover, all as more fully hereinafter explained.

Figure 1:
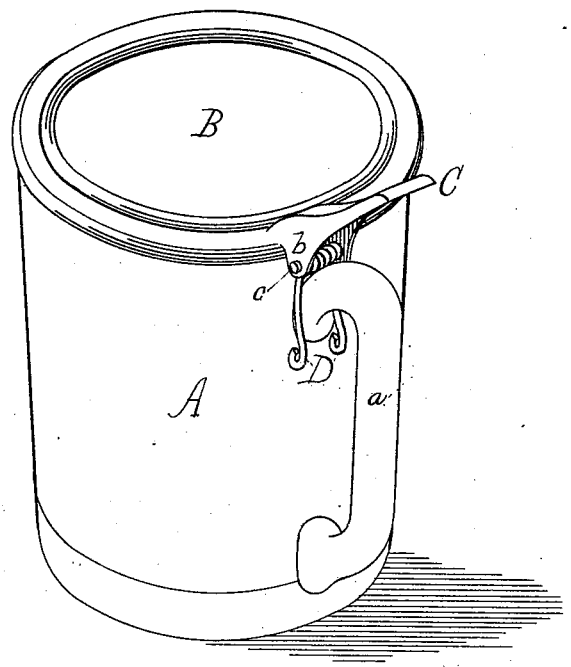
Figure 2:
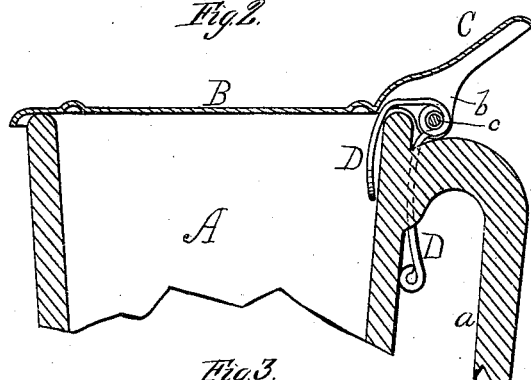
Figure 3:
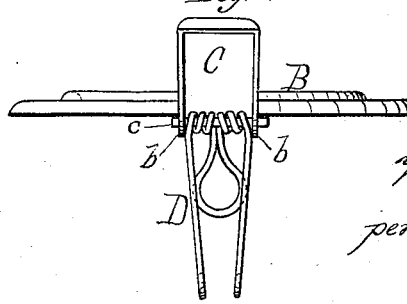

In the accompanying drawings, forming a part hereof, Figure 1 is a perspective view of a beer-glass with my cover attached thereto; Fig. 2, a sectional view of the same; and Fig. 3, an edge view of the cover, showing the clamp in elevation.

A is a glass or mug, and *a* the handle on its side. B is the cover, which is made preferably of sheet metal of circular form, and has projecting from its edge a thumb-piece, C, for tilting the cover open when in position on the glass.

Both the cover and thumb-piece I make preferably by stamping them from sheet metal of proper thickness. From the sides of the thumb-piece C there hang pendent lips *b*, which rest outside of the rim of the glass and receive the pivot-pin *c*, for hinging the cover to the clamp D. This clamp is made preferably from a single piece of spring-wire, which is twisted around the pin *c*, the inner jaw of the clamp being a loop, while the outer jaw is formed by the two ends of the wire, which will straddle the handle of a glass or mug.

This cover, it will be seen, can be easily attached to any glass, and when the user raises the glass to drink he can open the cover by pressing on the thumb-piece. This cover is equally well adapted to glasses without handles and to sugar-bowls or other similar small vessels.

What I claim as my invention is—

1. A cover hinged to a clamp and adapted to be thereby removably attached at any point to the rim of a glass without such rim being especially constructed to receive the cover, substantially as described.

2. The detachable cover for glasses described, consisting of the cover B, thumb-piece C, and wire spring-clamp D, constructed and combined substantially as set forth and shown.

WILLIAM KONRAD.

Witnesses:
RICHD. N. DYER,
EMIL H. FROMMANN.